United States Patent
Vohmann et al.

(10) Patent No.: US 6,730,001 B1
(45) Date of Patent: May 4, 2004

(54) METHOD AND DEVICE FOR CONTROLLING AND ADJUSTING A CLUTCH IN AN INFINITELY VARIABLE AUTOMATIC GEARBOX

(75) Inventors: Martin Vohmann, Esslingen (DE); Ralf Dreibholz, Meckenbeuren (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 10/129,021

(22) PCT Filed: Oct. 24, 2000

(86) PCT No.: PCT/EP00/10457

§ 371 (c)(1), (2), (4) Date: Apr. 29, 2002

(87) PCT Pub. No.: WO01/33094

PCT Pub. Date: May 10, 2001

(30) Foreign Application Priority Data

Oct. 30, 1999 (DE) ............................ 199 52 351

(51) Int. Cl.⁷ .................. B60R 41/02; G06F 17/00; G06F 19/00; G06F 7/00
(52) U.S. Cl. .............. 477/176; 477/174; 477/180; 701/67; 701/68
(58) Field of Search ............... 477/70, 79, 86, 477/167, 174, 176, 180; 701/67, 68

(56) References Cited

U.S. PATENT DOCUMENTS

| | | | |
|---|---|---|---|
| 4,648,496 A | 3/1987 | Petzold et al. | 192/0.076 |
| 4,817,462 A | 4/1989 | Dach et al. | 74/740 |
| 5,010,989 A | 4/1991 | Huntley | 192/0.033 |
| 5,024,310 A | * 6/1991 | Murano et al. | 477/39 |
| 5,491,635 A | 2/1996 | Foeldi et al. | 364/431.1 |
| 5,679,099 A | * 10/1997 | Kato et al. | 477/176 |
| 6,412,617 B1 | * 7/2002 | Spijker et al. | 192/3.55 |
| 6,471,022 B1 | * 10/2002 | Goebel et al. | 192/3.58 |

FOREIGN PATENT DOCUMENTS

| | | | |
|---|---|---|---|
| DE | 39 37 976 A1 | 5/1990 | B60K/23/02 |
| DE | 44 09 122 A1 | 2/1995 | B60K/41/02 |
| DE | 198 40 572 A1 | 3/2000 | F16D/48/06 |
| DE | 198 40 573 A1 | 3/2000 | F16D/48/06 |
| EP | 0 214 989 B2 | 3/1987 | F16H/3/66 |
| WO | 00/13928 | 3/2000 | B60K/41/22 |

* cited by examiner

Primary Examiner—Tisha D Lewis
(74) Attorney, Agent, or Firm—Davis & Bujold, PLLC

(57) ABSTRACT

A procedure for the control and regulation of a clutch of an automatic stepless transmission for a motor vehicle in which an electronic control device, via a first or second regulation circuit, determines the behavior of the clutch during three driving conditions and wherein a stepless gear ratio change is carried out from a first into a second gear ratio. In accord with the invention, for the control and the regulation of the clutch during the first driving condition, the first regulation circuit is employed, the size of the regulation thereof being equivalent to the actual value of the motor speed of rotation (n_MOT_IST). During the second driving condition, a second regulating circuit is employed, the size of the regulation thereof being equivalent to the actual value of a difference in speeds of rotation (dnK_IST) of the clutch and during the third driving condition, the clutch is subjected to a controlled pressure value dependent upon various value influences.

19 Claims, 3 Drawing Sheets

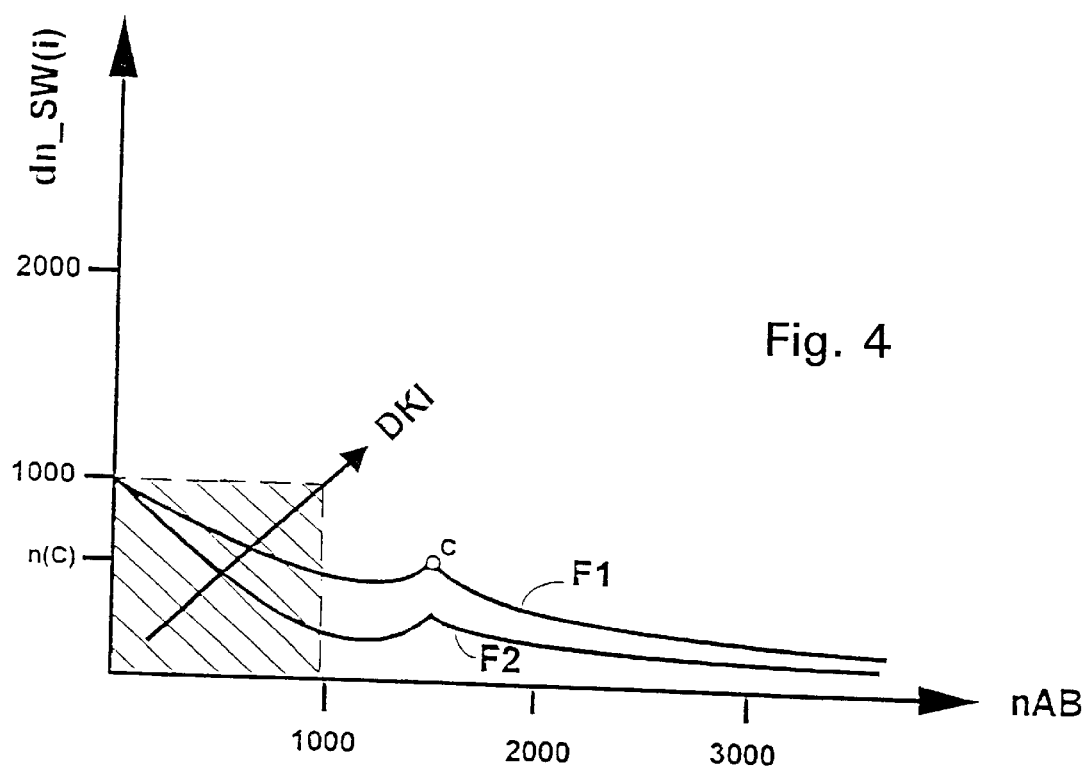

METHOD AND DEVICE FOR CONTROLLING AND ADJUSTING A CLUTCH IN AN INFINITELY VARIABLE AUTOMATIC GEARBOX

FIELD OF THE INVENTION

The invention concerns a procedure for control and adjustment of a clutch in a stepless, automatic transmission in which an electronic control apparatus with two regulation circuits determines the adjustment of the clutch. The invention further concerns an apparatus for the execution of the procedure for the control and adjustment of a clutch in a motor vehicle transmission.

BACKGROUND OF THE INVENTION

By the term, "clutch", within the concept of the invention, it is to be understood that a "start-up" clutch is meant. Under this classification are to be found clutches which are positioned between an internal combustion motor and an automatic transmission, also torque converter, bypass clutches as well as such clutches and brakes in automatic transmissions which can be employed both for start-up and for shifting.

In particular, the invention concerns wet start-up clutches which can be integrated into an automatic transmission. The majority of such clutches, however, are installed as a component assembly on the input side of the transmission. However, as a start-up element for an automatic stepless transmission, especially in a CVT, these wet clutches are also placed as a component assembly on the output side of the transmission.

Normally, clutches and brakes in automatic transmissions or in automatic stepped transmissions are electro-hydraulically activated, and operate independently of intervention by the shifting elements. The said clutches and brakes then perform as a gear position shifting means, or as gear change clutches in an assembly, or start-up clutches or yet as converter bypass clutches. To enable this service, usually an electronic transmission control apparatus acts specifically for an individual vehicle, while processing transmission and driving demands which are dependent upon the driving condition. These specifics can include axle gear ratios, transmission gear ratios, motor torque, motor rotation speed, throttle pedal position, or the like. The acquired data, as input, is processed in an electronic control apparatus and, by means of actuators and hydraulic valves, then converted into hydraulic control pressures designated for corresponding clutches. This latter data input would include clutch related signals, such as pressure control for pressure regulation or pressures during a gear change, and/or speed of rotation control during slip operation, all of which are transmitted to a hydraulic control apparatus and by means of actuators and hydraulic valves care converted to hydraulic control pressures for the corresponding clutch.

A procedure for the control of a start-up clutch, along with other matters, has been made known by DE 44 09 122 A1. The start-up control comprises, in this case, two phases. In a first phase, the input speed of rotation of the clutch is directed to a set-speed of rotation, wherein this set speed of rotation is determined by the driver's demand for power and a current mode of driving is determined. In the second phase, the difference between the input side and the output side speeds of rotation of the clutch is reduced to a set value of zero.

DE 39 37 976 discloses a procedure for the control of a clutch which serves for clutch non-interaction due to vibration disturbance. The slippage in the clutch changes, in this case, and is dependent upon speed-of-rotation-equalization as determined at the transmission output.

EP 0 214 989 B2 again makes known the use of a clutch integrated in an automatic transmission as a start-up element.

DE 198 40 573, of the applicant which up to now has not been published, describes a procedure for the control and regulation of a clutch in a stepless, automatic transmission for a motor vehicle according to which, the clutch control and regulation occurs during two driving conditions by means of a first control circuit. The degree of this control corresponds to the actual value of a difference in speed of rotation of the clutch. The first condition corresponds to a start-up process and the second condition corresponds to driving with a variable ratio arrangement.

From the likewise non-published DE 198 40 572 of the Applicant, a process for the control and regulation of a clutch in an automatic stepped transmission with traction interruption, that is to say, in an automatic stepped transmission which can shift in accord with the load is made known. With this method, during three conditions of driving (enumerated below), control is effected by means of a first regulating circuit. The degree of regulation, or-control, corresponds to the actual value of a difference in speeds of rotation of the clutch. The first condition of driving relates to a start-up process. The second condition of driving pertains to driving with a constant gear ratio. The third condition comes into play when load shifting, that is to say, a change of the ratio is initiated by a first into a second gear step of the automatic drive.

SUMMARY OF THE INVENTION

Given the above description of the state of the technology, the present invention has the purpose of making available a procedure for the control and regulation of a clutch in a stepless transmission for a motor vehicle along with an apparatus for the execution of said procedure for the control and regulation of a clutch, and to further develop the same with consideration given to the manifold usages of a single clutch, especially to achieve an improved quality of regulation and control-dynamics, in connection with an automatic stepped-transmission.

The object of the invention is to be found advantageously therein in that, during the first condition of driving, a first regulation circuit is employed for the control and regulation of the clutch. The degree of regulation corresponds to the actual value of the speed of rotation of the motor n_MOT_ IST and corresponds to the input speed of rotation of the clutch. During the second condition of driving, a second regulating circuit is used, the degree of regulation being equivalent to the actual value of the difference in rotational speeds of the clutch dnK_IST. Finally, during the third condition of driving, the clutch is subjected to controlled values of pressure which, in turn, are influenced by various factors. The three conditions of driving correspond, in the above, to a first condition comprising a start-up procedure when under a threshold vehicle driving speed during a traction operation, a second condition marked by driving the vehicle at a speed above the start-up procedure, i.e., above a threshold driving speed with a positive or a negative torque during a traction or a compression mode, as well as driving under a vehicle threshold speed with negative torque at the output, and a third condition, wherein the start-up condition differentiates itself from the other driving conditions in that the driving speed is less than a threshold value and the vehicle motor can stall under this said threshold value.

By means of the procedure in accord with the invention, a better reaction of the transmission control advantageously is achieved in regard to load shifting, especially upon letting up on the fuel feed in the third condition since, in this case, the control still performs an empty action upon the pressure at the clutch although no adjustment takes place.

Further, the difference in speeds of rotation over the clutch is not brought back to a value of zero. The advantageous consequence of this is that a non-interaction vibration between the motor and the transmission is achieved.

In an advantageous development of the invention, the proposal is made that the change in gear ratio in a stepless automatic transmission is principally determined by a third regulating circuit, and that the first and third, or second and third regulating circuits are bound together by means of a non-interacting network, which exhibits a first and a second signal path, respectively. More advantageously, it is proposed here, that for the change of the ratio from a first to a second gear ratio, an individual regulating circuit is employed, namely, the third circuit.

For this case, as for the situation during the ratio-change, the two regulating circuits, which find themselves in action, are bound to one another by a non-interacting network which advantageously allows that these two said regulating circuits do not interfere with one another during their functioning.

The proposal extends itself further in that during a gear ratio change from a first to a second gear ratio, the automatic transmission, during the first condition of driving, the first regulating circuit, by means of the non-interacting network, influences the third regulating circuit by means of a first signal path and in that the third regulating circuit, by a non-interacting means of the non-interaction network via a second regulation circuit, acts on the first regulation circuit.

In the case of a ratio change from a first to a second gear ratio during the second driving condition, the second regulating circuit acts by means of the non-interacting network, by way of the first signal path, on the third regulating circuit. At the same time the third regulating circuit acts, by means of the non-interacting circuit through a second signal path on the second regulating circuit.

In a development of the invention, the proposal is made to calculate the pressure level pAK of the clutch from an offset value pAK_OFF and a cumulative value pSUM. The cumulative value PSUM is principally determined by the sum of the controlled torque MK(ST) of the clutch, the regulated summated torque MK(RE)' of the clutch, and the disengaged load shift torque MLS_ENT.

The controlled torque MK(ST) is principally derived from the dynamic torque of the clutch, i.e., MDYN_K and the motor torque MMOT.

The regulated summated torque MK(RE)' of the clutch is determined from the dynamic motor torque MDYN_MOT and a regulated torque MK(RE).

The regulated torque MK(RE) in the first condition of driving is principally computed from set/actual comparison of one of the motor speeds of rotation n_MOT equivalent values and a load specific signal DKI of a driver by a device for increasing or decreasing the load.

The gear-ratio-dependent set difference in speeds of rotation dn_SW(i) for a start-up gear stage of the automatic transmission is determined, in the second condition of driving, by means of a characteristic field KF(i). This characteristic curve presents an arrangement of load specific signals of the driver DKI and an output speed of rotation nAB of the clutch.

The regulated torque in the second condition of driving MK(RE) is principally drawn out of the set/actual comparison of the speeds of rotation difference dnK_SW, dnK_IST of the clutch and a load specific signal initiated by a driver by a device for increasing or decreasing the load.

Advantageously the regulator contains a limited integrator, to which is fed as input the deviation from regulation from the set/actual comparison of the rotational speeds dnK_SW, dnK_IST of the clutch, the displacement speed of the load signal DKI and the relation of the actual to set values of the difference in rotational speeds, i.e., dnK_IST/dnK_SW of the clutch.

The set value of the difference in speed of rotation of the clutch dnK_SW advantageously arises from the addition of a set-value-offset dnLS_SW and a gear ratio dependent difference in rotational speed at the clutch dn_SW(i).

Advantageously, in the case of a transition from the first or third condition of driving to the second condition of driving, the set value of the difference in rotational speeds dnK_SW is conducted through a filter, this especially being a dynamic delay member, whereby, as the starting value of the delay member is set at the actual value of the difference in speeds of rotation, namely, dnK_IST.

In the second condition, there is an increase in the set value offset of the difference in speeds of rotation, dnLS_SW of the clutch, during a gear ratio change from a first into a second gear ratio stage of the automatic transmission.

The characteristic fields are here so formulated, that, at a vehicle speed v less than a threshold value GW, an increased difference in the speeds of rotation dn_SW(i) of the clutch arises. By this action, an effective prevention of stalling during non-start-up gear positions, that is, for example, while driving at a constant ratio of the automatic transmission is achieved.

Advantageously, also in the second condition of driving, at a vehicle speed v less a threshold value GW, an increased difference in speeds of rotation dn_SW(i) of the clutch is considered to be a deterrent to stalling. When this is done, the increased difference in rotational speeds dn_SW(i) is input as larger than the difference from the most minimal speed of rotation of the internal combustion motor nMOT_MIN and the output speed of rotation nAB of the clutch.

In the third condition of driving, the pressure level pAK of the clutch arises from a pressure value, which is dependent upon one or several of the following values: throttle flap position; brake activity; brake pressure; motor torque and load shifting or the like, and wherein the pressure value is a controlled value.

More advantageously, an apparatus is made available for the execution of a procedure for the control and regulation of a clutch in a stepless automatic transmission for a motor vehicle. This apparatus provides an electronic control system with a first and a second regulating circuit, whereby the degree of regulation of the first regulating circuit is equivalent to the actual value of the motor speed of rotation and the degree of regulation of the second regulation circuit is equivalent to-the actual value of a difference in speeds of rotation at the clutch.

Furthermore, a third circuit of regulation is provided which is connected with the first and the second circuits of regulation through a non-interacting net work, and wherein the third regulating circuit determines the load shifting.

Further the non-interacting network exhibits a first and a second signal path, respectively, between the first and the third regulation circuit and also between the second and the third regulation circuit.

BRIEF DESCRIPTION OF THE DRAWINGS

The invention will now be described, by way of example, with reference to the accompanying drawings in which:

FIG. 4 is a characteristic field for non-start-up gear ratios.

DETAILED DESCRIPTION OF THE INVENTION

Figure 1:
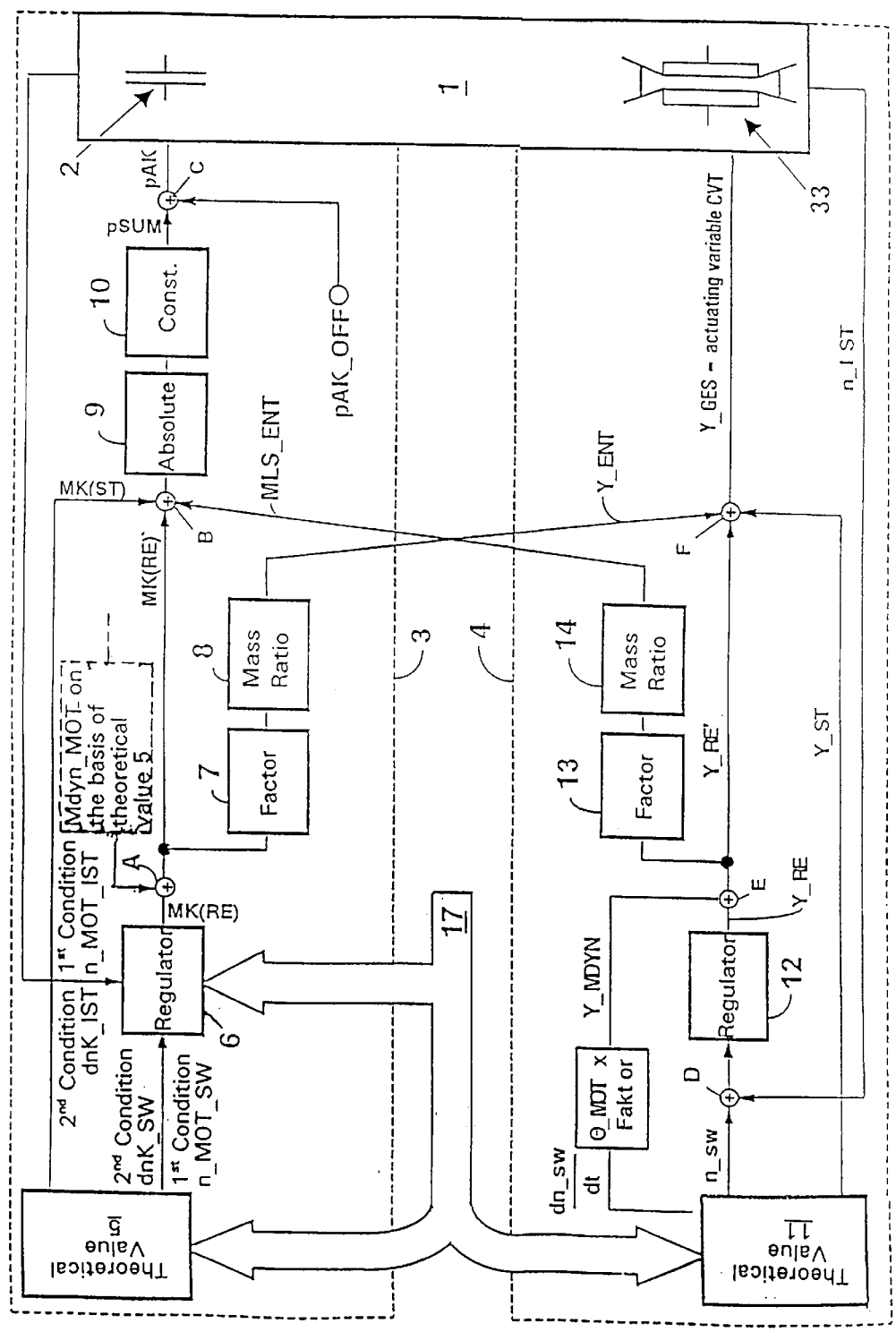
FIG. 1 is a general overview of the first and second regulating circuits.

FIG. 1 shows a panoramic overview of the two regulation circuits. Reference number 3 denotes the first regulation circuit for control and regulation of clutch 2. Reference number 4 identifies the second regulation circuit for control and regulation of a stepless transmission. A variator is depicted in FIG. 1 by the reference number 33.

As to clutch 2, it is to be understood, in keeping with the invention, that a start-up clutch is referred to. This can be located on the input side of the stepless Both the first, as well as the second regulation circuits 3, 4 are supplied by 17 with signal data. The input data from 17 comprises the signal of a load demand from the driver this being severally, the throttle flap data DKI, or its gradient, the torque of an internal combustion motor (not shown), which drives the stepless transmission 1, and the input/output rotational speeds of the clutch 2. The first regulation circuit comprises the blocks: set value signal 5, regulator 6, factor 7, weight ratio 8, absolute value 9 and constant 10. The set value signal 5 delivers as output values, the set value of the difference of the speeds of rotation dnK_SW of the clutch 2 and the controlled torque MK(ST) of the clutch 2 as well as the dynamic motor torque MDYN_MOT. The inner structure of the set value signal 5 is explained in connection with FIG. 2. At the regulator 6, lie the input values 17, the regulator set value as well as the actual values. In the first condition, the regulator set value represents the motor set value of speed of rotation n_MOT_SW and the actual value of the motor speed of rotation n_MOT_IST. In the second condition, the regulator set value represents the set difference of speeds of rotation at the clutch 2 dnK_SW and the actual value of the actual difference in speed of rotation at the clutch 2 dnK_IST. The inner structure of the regulator 6 is explained below in connection with FIG. 3. The output values of the regulator 6 is the regulated motor torque MK(RE) of the clutch 2. From the regulated torque MK(RE)' of the clutch 2 and from the dynamic motor torque MDYB_MOT the regulated cumulative torque MK(RE)' is derived at summation point A. At summation point B, this amount will be added to the controlled torque MK(ST) which is derived from the set value signal 5 of the clutch 2 and the non-interacting torque M_CVT of the stepless transmission. From this sum, the absolute value is formed, by means of the function block 9, and the result is weighted with a constant by function block 10. The output value is a summated pressure pSUM. A pressure offset pAK_OFF is superimposed onto this summated pressure pSUM, at summation point C. The pressure level which is evolved therefrom, namely pAK, is the effective pressure acting upon the clutch 2. The second regulation circuit 4 comprises: set value signal 11, regulator 12, factor 13, weight ratio 14 and the product of motor inertial torque times the factor 13. The second regulation circuit 4 determines the running of the stepless change. From the input values 17, the function block set value signal 11 determines the set value n_SW of the stepless change, and the controlled portion of the set value of the stepless transmission Y_ST. The set value n_SW is compared with the actual value n_IST of the stepless change at the summation point D. The actual value n_IST arises from the output values of the stepless transmission 1. The regulation deviation, which generates itself is the input value of the regulator 12. The regulator output value Y_RG is added to the dynamic torque portion Y_MDYN, from the set value signal 11, at the summation point E. From this the regulated portion Y_(RE)' arises. This is added to the controlled portion Y_ST and to the disengaged portion Y_ENT at the summation point F. From this sum, an actuating variable value for the stepless transmission is formed. The result is the actuating variable Y_GES for the variator 33.

The first and second regulatory circuits 3, 4 are bound together through a non-interacting network The non-interacting network contains a first signal path, in which the function block 7 and the function block 8 are placed. The input value of the first signal path is the regulated cumulative torque MK(RE)'. This is multiplied by a factor, namely function block 7. This factor is empirically adjusted. The result of this operation, in function block 8, is biased with the weight ratio of the motor weight to the weight of the transmission. The output value, on this account, is then the non-interacting part Y-ENT of the clutch 2. The second signal path of the non-interacting network possesses the function blocks 13 and 14, the input values of which make up the regulated portion Y_(RE)' of the stepless shift. The output value of the second signal path is the non-interacting torque of the stepless ratio M_ENT.

Figure 2:
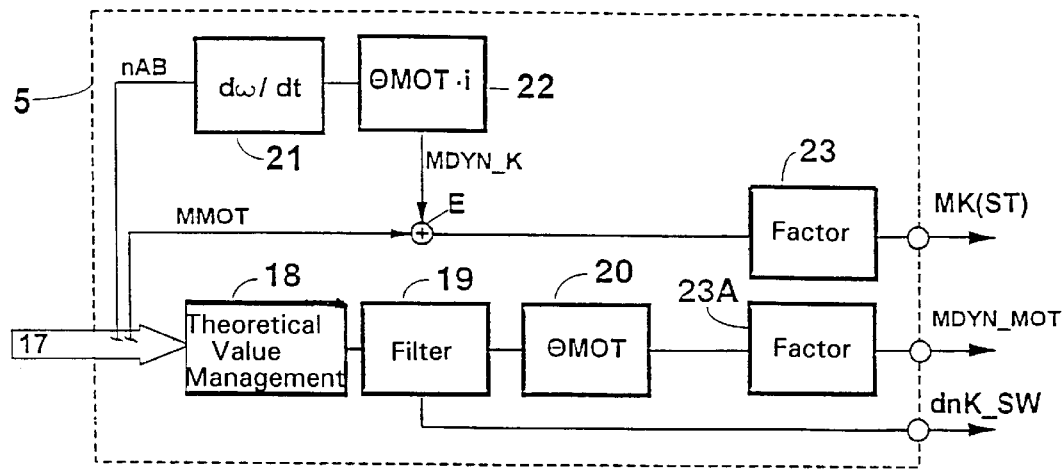
FIG. 2 is a function block diagram 5 of set value signals.

The inner structure of the set-value signal 5 shown in FIG. 2 and the described input signals from 17 are directed thereto. In the function block 18, termed, "Set value management", the input value of the speed of rotation of the internal combustion motor, throttle flap position DKI, and the torque of the said internal combustion motor provide a rough set-value of the difference in speeds of rotation of the clutch 2. This value is conducted to filter 19, which is generally a PT-1 member with a slope limitation, and is filtered at this point. One output value of the filter 19 is a set value dnk_SW which represents the difference in speeds of rotation of the clutch 2. This set value is made available at the output port of the set value signal 5. A second output value of the filter 19 is directed to the function block 20 which represents the input of the motor inertial torque θ-MOT and subsequently modified by a factor 23A. The output is then the dynamic torque of the internal combustion motor MDYN_MOT. From the output speed of rotation nAB of the clutch, by means of the function block 21, the angular speed gradient dω/dt is determined. The result is multiplied with the motor inertia torque θ-MOT and with the actual ratio of the automatic step transmission represented by "i" in the function block 22. The product, i.e., the output value, is the dynamic torque MDYN_K at the clutch 2. The following equation now holds true:

$$MDYN\_K = f(\theta MOT, i, i/dt, \omega, d\omega/dt)$$

where:

| | |
|---|---|
| MDYN_K: | dynamic moment of clutch |
| θ-MOT: | Inertial torque of internal combustion motor |
| i: | actual gear ratio stage |
| dω/dt | gradient (slope) of the angular speed at clutch |

| | |
|---|---|
| di/dt | actual gear ratio gradient (slope), and |
| ω | Angular speed at clutch. |

At the summation point E, this dynamic torque of the clutch 2 is combined with the torque MMOT from the internal combustion motor. This result is then added to the previously computed dynamic torque of the internal combustion motor MDYD_MOT, at the summation point F. The result thereof is weighted with a tuning factor in the function block 23, the output magnitude of which is the controlled torque (MK(ST)) of the clutch 2.

Figure 3:
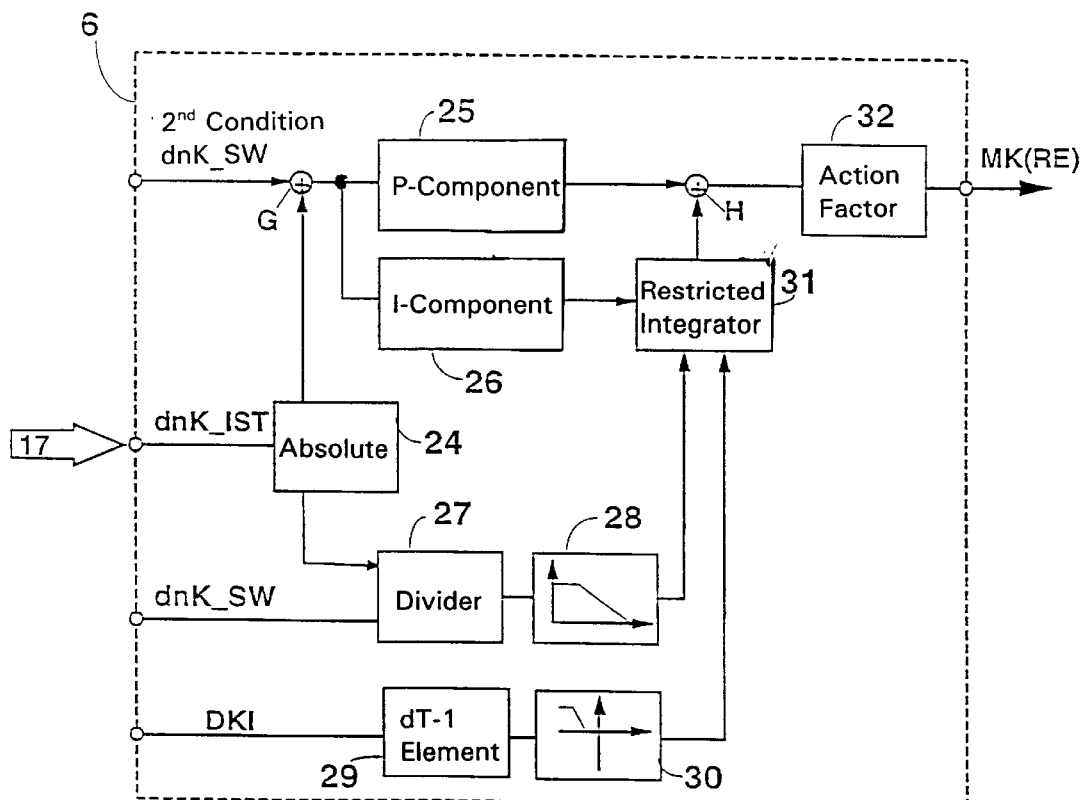
FIG. 3 is a function block 6 of the regulator.

In FIG. 3 is shown the inner structure of the regulator 6. Input to the regulator 6 comprises the data from 17 as well as the set value dnK_SW, and the actual value dnK_IST, both concerning the difference of the speeds of rotation of the clutch 2. The function block 24 forms an absolute value from the actual value dnK_IST. This absolute value is then the input value for the divider 27 and for the summation point G. At the divider 27, the set value dnK_SW, i.e., the difference of speeds of rotation of the clutch 2, is delivered as a second input. The resulting quotient is conducted to the function block 28, the characteristic line of dynamic depressing. By means of this characteristic line, in the case of very small slippage amounts, for example, less than 10 revolutions, the input value of the integrator 31 is artificially increased. By this means, an additional ramplike pressure reduction is achieved. The point of application arises from the ratio of the actual to the set value of the difference in speed of rotation of the clutch 2. The input value designated "throttle flap data" DKI is the input signal for a dT1-member, this being filter block 29. The output signal of this filter is then the input signal for the characteristic line "Open Quick!", i.e., block 30. By means of this characteristic line, which is dependent upon the load desire of the driver, that is, the driver's selected rate of change in making a rapid gas retraction, the input value to the integrator 31 is artificially increased. By this action, an additional ramp shaped pressure reduction is achieved. The pressure reduction can be altered by the characteristic line.

At the summation point G, the set value dnK_SW is added to the absolute value—which was which was formed in function block 24—of actual value of difference in rotational speeds of clutch 2. The result of this is then conducted, in parallel, wherein one portion is runs through a function block P-part 25 and another portion runs through function block I-part 26. The output value of the P-part 25 acts upon the summation point H. The output value of the function block 26 is conducted to the limited integrator 31. The output value of the said limited integrator 31 now joins the P-part (i.e., the proportional portion) from function block 25 at summation point H. The result from summation point H is conducted to the function block, action factor 32. By means of this action factor, the direction is determined, in which directional sense the actual regulated torque is to act. This is necessary for the determination of the non-interacting portion Y_ENT.

In FIG. 4, a gear-ratio-dependent characteristic field KH(i) is shown. By means of this field KF(i), the difference of rotational speeds dn_SW(i) is determined for non-start-up ratios of the stepless transmission. The characteristic field contains a defined zone between the limiting curves F1 and F2. The limiting curve F2 represents 0% and the limiting curve F1 represents 100% of the throttle flap information DKI. A point C is marked on the limiting line F1. This excess height of the speed of rotation, value n(c) so acts, that the clutch is retained in a slipping condition, so that an active vibratory disengagement occurs. Within the characteristic curve is presented a cross-hatched area. This area serves for the protection against stalling, that is, upon small output speeds of rotation nAB the clutch 2 is biased with a defined set value of the difference in rotational speeds. The protection for stalling can also be computed by the following relationship:

$$dnK\_SW(i>NMOT\_MIN-nAB)$$

where:
NMOT_MIN is the minimum rotational speed of the internal combustion motor; and NAB is the output speed of rotation of the clutch 2.

For various zones of gear ratios, corresponding characteristic fields exist. The transition from a first KF(1) to a second KF(i) is done during the change of the stepless transmission 1.

The sequence of the procedure, in accord with the invention, is as follows:

First Condition

The start-up is carried out by means of regulation of the motor speed of rotation. The vehicle sets itself into motion up to a point exceeding the lower limit of the threshold of difference in rotational speeds of the clutch 2. That is to say, after exceeding the basic speed of the transition point of the second condition.

Second Condition

Now the difference in speeds of rotation of the clutch is regulated. The set value is taken from the characteristic field corresponding to the gear ratio. In order to achieve a smooth transition, the actual differential speed of rotation dnK_IST is input to the filter installed after the set value generator as a starting value. In this way, a continuous changing of the actual difference of rotational speeds is achieved and therewith a smooth run of clutch torque is assured.

If now a stepless gear change is initiated, then a change is made from the characteristic field KF(i1) to a characteristic field KF(i2) in accord with FIG. 4. During the stepless change, a non-interacting part M_CVT is added to controlled torque MK(ST) and regulated cumulative torque MK(RE)' by means of the non-interacting network via the second signal path. Via the first signal path, a non-interacting part Y_ENT of the clutch 2 is added to the variator which is to make the change.

| Reference Number and Item List | |
|---|---|
| 1 | stepless transmission or CVT |
| 2 | clutch |
| 3 | first regulation circuit |
| 4 | second regulation circuit |
| 5 | set value signal |
| 6 | regulator |
| 7 | factor |
| 8 | computation block, weight relationship |
| 9 | absolute value, a converter |
| 10 | a constant |
| 11 | set value signal |
| 12 | regulator |
| 13 | factor |
| 14 | computation block, weight relationship |
| 17 | input values |
| 18 | set value management |

-continued

Reference Number and Item List

| | |
|---|---|
| 19 | filter |
| 20 | inertial torque |
| 21 | computation block, i.e. dOmega/dt |
| 22 | computation block |
| 23, 23A | factor |
| 24 | absolute value |
| 25 | P-part |
| 26 | I-part |
| 27 | divider |
| 28 | characteristic field, dynamic reduction |
| 29 | dT1-member (filter) |
| 30 | characteristic line (Open Quick!) |
| 31 | limited integrator. |
| 32 | action factor |
| 33 | variator |
| dn_SW(i) | gear ratio dependent difference in rotational speeds |
| dnK_SW | set value difference in rotational speeds at clutch |
| dnK_IST | actual value difference in rotation speeds at clutch |
| MK(ST) | controlled motor torque |
| MK(RE) | regulated torque at clutch |
| MK(RE)' | regulated cumulative torque at clutch |
| pAK-OFF | pressure off-set start-up clutch |
| PSUM | summated pressure |
| PAK | pressure level at clutch |
| MDYN_K | dynamic torque at clutch |
| pLS_OFF | pressure off-set, load shifting |
| nEIN | input side speed or rotation at clutch |
| nAB | output side speed of rotation at clutch |
| n_MOT_SW | set value speed of rotation of motor |
| n_MOT_IST | actual speed of rotation of motor |
| n-MOT_MIN | minimal speed of rotation of internal combustion motor |
| Y_ST | controlled portion of the actuating variable of the variator |
| Y_RE | regulated portion of the actuating variable of the variator |
| Y_REI | sum of the portions Y-RE and Y-MDYN |
| Y_ENT | non-interactive portion of the actuating variable of the variator |
| Y_MDYN | set gradient portion of the actuating variable of the variator |
| Y_GES | actuating variable for variator |
| Y_RG | output value of regulator |
| MMOT | motor torque |
| MDYN_MOT | dynamic motor torque |
| M-CVT | non-interactive torque of the variator regulation |
| DKI | throttle flap data = load position |
| dnLS_SW | set value-offset |
| Theta_MOT | motor inertial torque |
| i-CVT | actual variator ratio |
| il, i2 | stage of ratio |
| KF(i) | characteristic field |
| v | velocity (speed) of vehicle |
| GW | threshold vehicle speed |

What is claimed is:

1. A procedure for control and regulation of a clutch of an automatic stepless transmission for a motor vehicle comprising the steps of:
determining in an electronic control apparatus a behavior of the clutch via one of a first regulation circuit and a second regulation circuit, whereby first and second driving conditions are provided for and the first driving condition represents a start-up process for a vehicle during a traction operation driven at a speed less than a given threshold speed value, the second driving condition represents driving above said threshold vehicle speed and a stepless change in gear ratio from a first gear ratio (i1) to a second gear ratio (i2) can be carried out,
employing the first regulation circuit for the control and regulation during the first driving condition and a regulation size thereof is equivalent to an actual value of the speed of rotation of a motor (n_MOT_IST) and a second regulation circuit is used during the second driving condition and a regulation size thereof is equivalent to the actual value of a difference in the speeds of rotation (dnK_IST) of the clutch therein;
subjecting the clutch to a controlled pressure during a third driving condition which represents driving below the threshold value during a compression mode, the value of which is influenced by various values, and the actual value of the difference in rotational speeds (dnK_IST) of the clutch is not set back to a zero value.

2. The procedure according to claim 1 further comprising the steps of determining the gear ratio change is principally by a third regulation circuit and either the first and third regulation circuits or the second and third regulation circuits are bound together by a non-interacting network whereby the non-interacting network exhibits respective first and second signal paths.

3. The procedure according to claim 2 further comprising the steps of controlling the first regulation circuit, via the non-interacting network, to act upon the third regulation circuit via the first signal path and the third regulation circuit to act upon the first regulation circuit via the second signal path by way of the non-interacting network during the gear ratio change from the first gear ratio (i1) to the second gear ratio (i2) of the automatic transmission during the first driving condition.

4. The procedure according to claim 2 further comprising the steps of controlling the second regulation circuit to act upon the third regulation circuit via the first signal path by way of the non-interacting network and the third regulating circuit to act upon the second regulating circuit via the second signal path by way of the non-interacting network during the gear ratio change from the first gear ratio (i1) to the second gear ratio (i2) of the automatic transmission during the second driving condition.

5. The procedure according to claim 1 further comprising the steps of establishing a pressure level (pAK) of the clutch during the first and second driving conditions, from an offset value (pAK_OFF) and a collective sum value (pSUM), namely (pAK=paK_OFF+pSUM), wherein the sum value (pSUM) is derived principally from addition of a control torque (MK(ST)) of the clutch, regulated collecting torque (MK(RE)') of the clutch and a non-interacting load shift torque (MLS_ENT), wherein $$(pSUM=f(MK(ST), MK(RE)', MLS\_ENT)).$$

6. The procedure according to claim 5 further comprising the step of establishing the controlled torque (MK(ST)) principally from a dynamic torque of the clutch (MDYN_K) and a motor torque (MMOT),
whereby, $$(MK(ST)=f(MDYN\_K, MMOT).$$

7. The procedure according to claim 5 further comprising the step of determining the regulated collecting torque (MK(RE)') of the clutch from a dynamic motor torque (MDYN_MOT) and a regulated torque (MK(RE)) of the clutch.

8. The procedure according to claim 7, further comprising the step of determining during the first driving condition, the regulated torque (MK(RE)) of the clutch principally from the set/actual comparison of a value equivalent to the motor speed of rotation and a load signal (DKI) of a driver via a load adjuster.

9. The procedure according to claim 1 further comprising the step of determining a gear ratio-dependent set speed of rotation (n_Mot_SW(i)) for a start-up gear of the automatic transmission by characteristic field (KF(i)), whereby the characteristic field (KF(i)) presents an interaction of a load signal from the driver (DKI) with output side speed of rotation (nAB) of the clutch.

10. The procedure according to claim 9 further comprising the step of determining for the second driving condition, a regulated torque (MK(RE)) of the clutch principally by the set/actual comparison of the speeds of rotation difference (dnK_SW, dnK_IST) of the clutch and a load signal DKI from a driver by a load adjuster.

11. The procedure according to claim 10 further comprising the step of providing the regulator with a limited integrator and sending, a deviation in regulation from the set/actual comparison of the difference in speeds of rotation (dnK_SW, dnK_IST) of the clutch, the speed of the changing of the load signal (DKI), and the ratio of the actual/set values of the difference of rotational speeds (dnK_IST/dnK_SW) at the clutch, as inputs to the limited integrator.

12. The procedure according to claim 10 further comprising the step of obtaining the set value of the difference in speeds of rotation (dnK_SW) of the clutch from addition of a set value off-set (dnLS_SW) and a gear-ratio-dependent difference in speeds of rotation (dn_SW(i)) at the clutch.

13. The procedure according to claim 12 further comprising the step of conducting the set value of the difference in rotational speeds (dnK_SW) through a dynamic delay member, wherein a starting value of said delay member is the actual value of the difference in rotational speeds (dnK_IST) during a transition from the first driving condition or the third driving condition into the second driving condition.

14. The procedure according to claim 12 further comprising the step of increasing the set-value offset of the difference of speeds of rotation (dnLS_SW) of the clutch during a;change in gear ratio from the first gear ratio (i1) to the second gear ratio (i2) of the automatic transmission in a phase of load increase adjustment or in a phase adjusting a gradient during the second driving condition.

15. The procedure according to claim 13 further comprising the step of introducing an increased difference in speeds of rotation (dn_SW(i)) at the clutch, as a protection against stalling, by way of a corresponding characteristic field (KF(i)), when a vehicle speed (v) is less than a threshold value (GW).

16. The procedure according to claim 12 further comprising the step of considering, at a vehicle speed (v) less than a threshold (GW) and during the second driving condition, an increased difference in speeds of rotation (dn_SW(i)) of the clutch as a protection against stalling when the difference in speeds of rotation (dn_SW(i)) is input at a greater value than the difference of a minimum speed of rotation of the internal combustion motor (n_MOT_MIN) and the output side speed of rotation of the clutch (nAB).

17. The procedure according to claim 1 further comprising the step of establishing a pressure level (pAK) of the clutch during the third driving condition from a pressure value dependent upon one or more of the following values:

a throttle flap position, activation of a brake, brake pressure, motor torque, a load shifting, and the pressure level (pAK) is a controlled value.

18. An apparatus for execution of a procedure for control and regulation of a clutch of an automatic stepless transmission for a motor vehicle comprising:

an electronic control apparatus determines a behavior of the clutch via one of a first regulation circuit and a second regulation circuit, whereby first and second driving conditions are provided for and the first driving condition represents a start-up process for the vehicle during a traction operation driven at a speed less than a given threshold speed value, the second driving condition represents driving above said threshold vehicle speed and a stepless change in gear ratio from a first gear ratio (i1) to a second gear ratio (i2) can be carried out, whereby the first regulation circuit is employed for the control and regulation during the first driving condition and a regulation size thereof is equivalent to an actual value of the speed of rotation of a motor (n_MOT_IST) and the second regulation circuit is used during the second driving condition and a regulation size thereof is equivalent to the actual value of a difference in the speeds of rotation (dnK_IST) of the clutch therein;

wherein during a third driving condition, which represents driving below the threshold value during a compression mode, the clutch is subjected to a controlled pressure, the value of which is influenced by various values, and the actual value of the difference in rotational speeds (dnK_IST) of the clutch is not set back to a zero value; and a third regulation circuit which, by means of a non-interacting network is connected with the first regulation circuit and the second regulation circuit, a regulation size of the first regulation circuit is equivalent to an actual value of the speed of rotation of the motor (n_MOT_IST) and a size of regulation of the second regulation circuit is equivalent to the actual value of a difference in the speeds of rotation (dnK_IST) of the clutch and the actual value of the difference in speeds of rotation (dnK_IST) of the clutch is not set back to a zero value.

19. The apparatus according to claim 18, wherein the non-interacting network provides both a first signal path between the first and the second regulation circuits and a second signal path between the first and the second regulation circuits.

* * * * *